United States Patent
Heraldo et al.

(10) Patent No.: US 8,572,843 B2
(45) Date of Patent: Nov. 5, 2013

(54) METHOD, PRODUCTION LINE, AND PISTON BLANK USED FOR THE PRODUCTION OF A MONOLITHIC PISTON FOR COMBUSTION ENGINES, AND PISTON FOR COMBUSTION ENGINES

(75) Inventors: Carlos Furquim Heraldo, Jundiai-Sp (BR); Joao Lester Garcia, Jundiai-Sp (BR)

(73) Assignee: ThyssenKrupp Metalurgica Campo Limpo Ltda., Campo Paulistra-SP (ES)

( * ) Notice: Subject to any disclaimer, the term of this patent is extended or adjusted under 35 U.S.C. 154(b) by 987 days.

(21) Appl. No.: 12/064,891

(22) PCT Filed: Jul. 18, 2006

(86) PCT No.: PCT/EP2006/064368
§ 371 (c)(1),
(2), (4) Date: May 16, 2008

(87) PCT Pub. No.: WO2007/025799
PCT Pub. Date: Mar. 8, 2007

(65) Prior Publication Data
US 2009/0013531 A1    Jan. 15, 2009

(30) Foreign Application Priority Data

Aug. 29, 2005   (DE) .......................... 10 2005 041 000

(51) Int. Cl.
*B21D 22/00*   (2006.01)
*B23P 15/10*   (2006.01)
*F16J 1/00*   (2006.01)

(52) U.S. Cl.
USPC ............... 29/888.04; 29/888.047; 92/172; 92/208; 72/352; 72/356

(58) Field of Classification Search
USPC ............... 29/888.04, 791, 888.042, 888.049; 72/347, 349, 356, 358, 352, 353.2, 72/353.6, 354.2; 92/172
See application file for complete search history.

(56) References Cited

U.S. PATENT DOCUMENTS 2,024,285 A * 12/1935 Handler ..................... 29/888.04
2,344,358 A *  3/1944 King ........................ 29/888.04
(Continued)

FOREIGN PATENT DOCUMENTS

DE    100 13 395    8/2001
DE    102 44 513    4/2004
(Continued)

OTHER PUBLICATIONS

International Search Report from PCT/EP2006/064368.

*Primary Examiner* — Alexander P Taousakis
(74) *Attorney, Agent, or Firm* — The Webb Law Firm

(57) ABSTRACT

A method and a manufacturing line allow for the manufacture of piston blanks of dimensions close to the final dimensions, which in the course of subsequent finish-machining need only be machined with removal of material to a small degree. A piston shaft of the piston blank is produced by backward extrusion. At least one hollow throat element is already produced at the piston blank by an upset-forging operation. For this purpose, a special forging tool is provided, which, after the manufacture of the piston shaft, takes effect on the piston blank in such a way that at least one hollow throat element is formed at the latest at subsequent forming of the piston base. In this way, a perceptible reduction is achieved in the weight of a piston in relation to conventionally manufactured forging pistons.

8 Claims, 6 Drawing Sheets

(56) References Cited

U.S. PATENT DOCUMENTS

| | | | |
|---|---|---|---|
| 2,465,792 A * | 3/1949 | Davis | 92/208 |
| 2,667,390 A * | 1/1954 | Watson et al. | 92/239 |
| 2,756,876 A * | 7/1956 | Watson et al. | 72/267 |
| 2,795,467 A * | 6/1957 | Colwell | 92/222 |
| 4,294,101 A | 10/1981 | Diemer | |
| 6,070,323 A * | 6/2000 | Koike et al. | 29/888.04 |
| 6,474,220 B2 | 11/2002 | Ries | |
| 6,691,666 B1 | 2/2004 | Berr | |
| 7,104,183 B2 * | 9/2006 | Huang | 92/186 |
| 8,037,810 B2 * | 10/2011 | Leidecker et al. | 92/172 |

FOREIGN PATENT DOCUMENTS

| | | |
|---|---|---|
| GB | 1 141 084 | 1/1969 |
| JP | 2004 344907 | 12/2004 |

\* cited by examiner

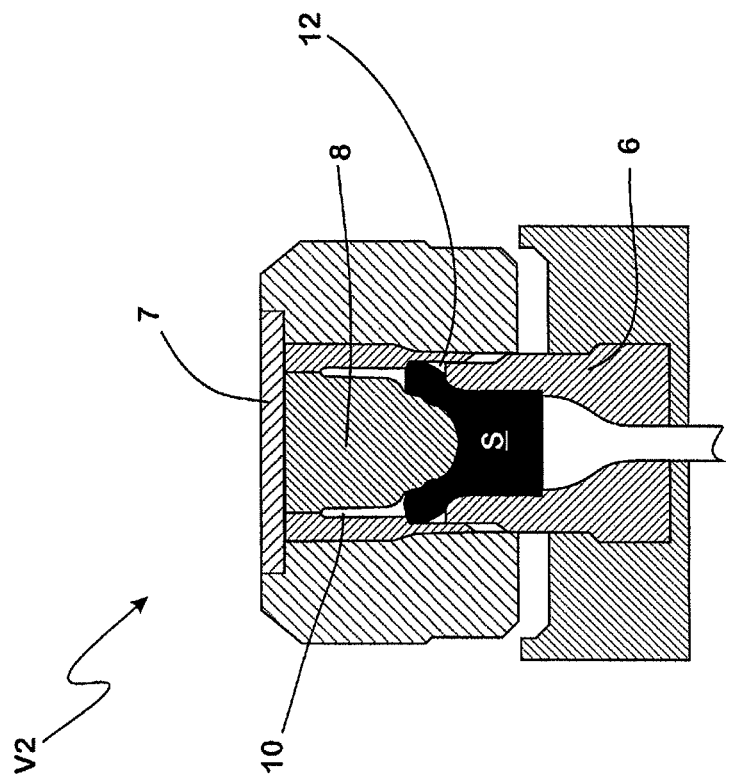
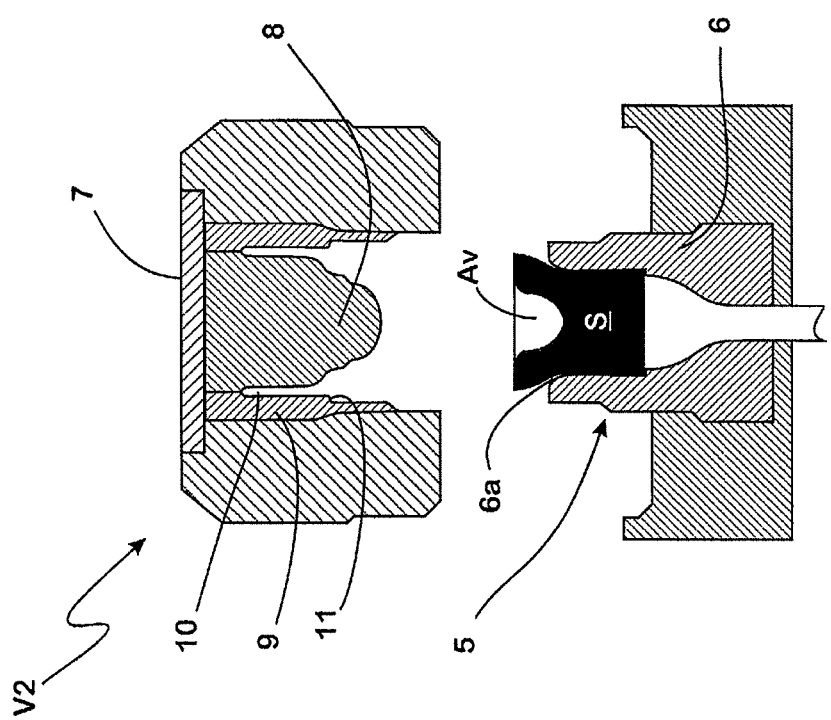
Fig. 2a
Fig. 2b

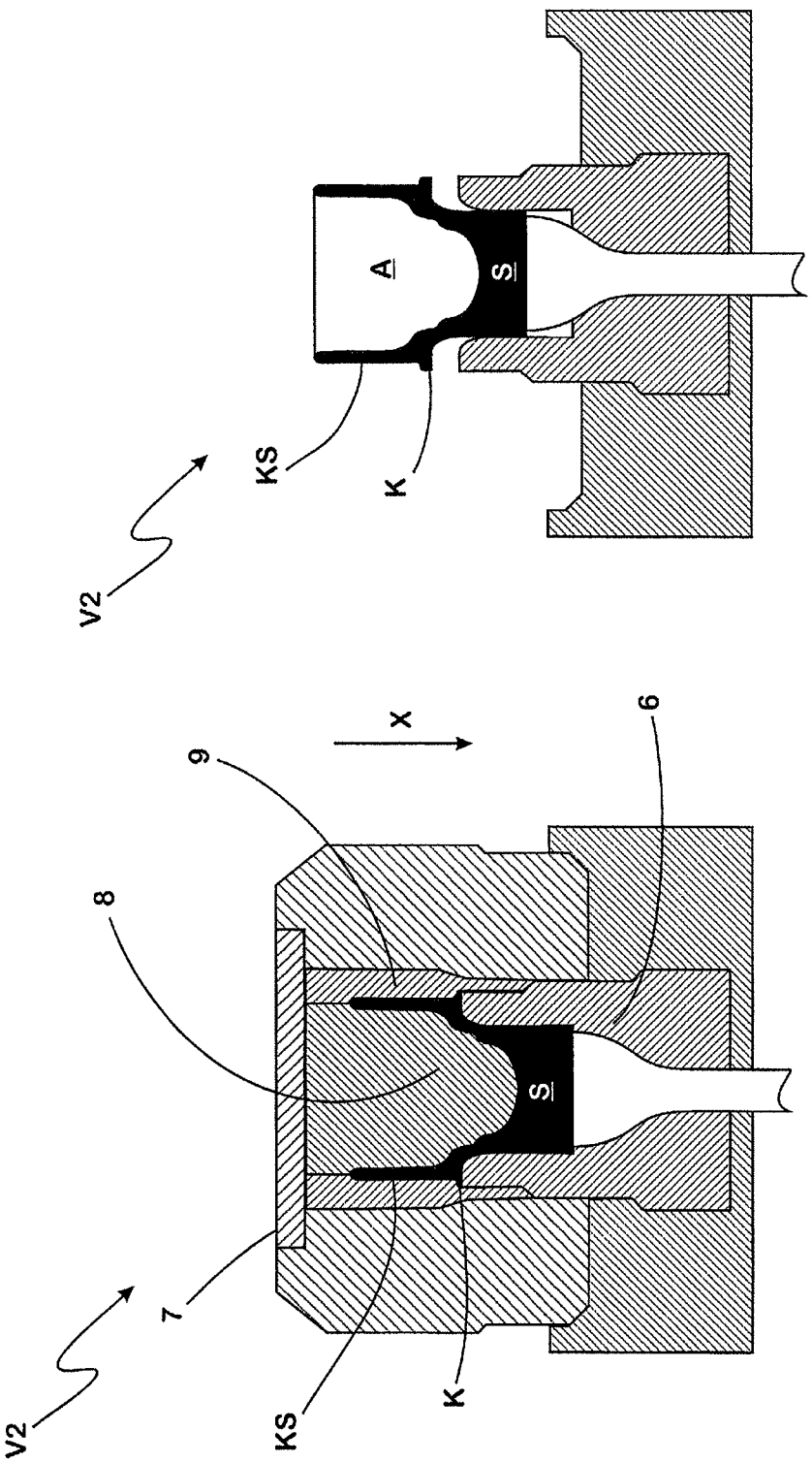

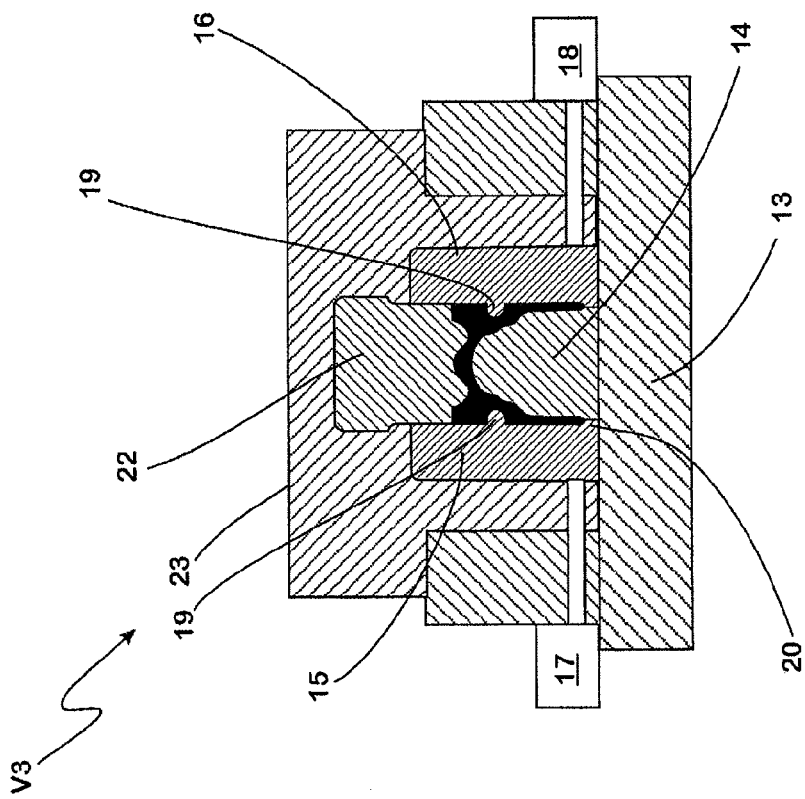
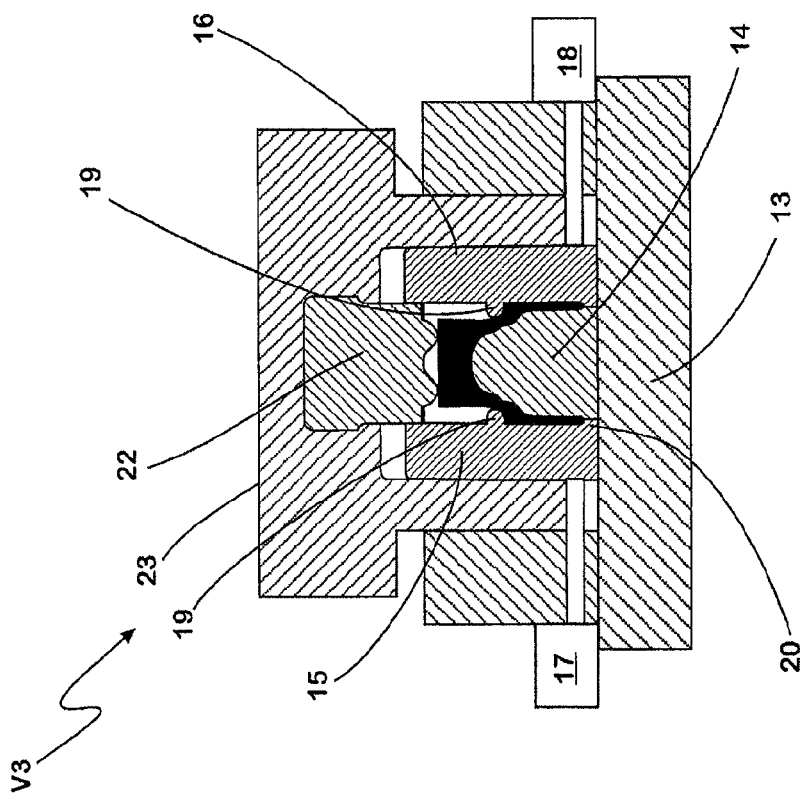
Fig. 4a
Fig. 4b

METHOD, PRODUCTION LINE, AND PISTON BLANK USED FOR THE PRODUCTION OF A MONOLITHIC PISTON FOR COMBUSTION ENGINES, AND PISTON FOR COMBUSTION ENGINES

CROSS-REFERENCE TO RELATED APPLICATIONS

This application is a National Phase Application of International Application No. PCT/EP2006/064368, filed on Jul. 18, 2006, which claims the benefit of and priority to German patent application no. DE 10 2005 041 000.6-14, filed Aug. 29, 2005, which is owned by the assignee of the instant application. The disclosure of each of the above applications is incorporated herein by reference in their entirety.

FIELD OF THE INVENTION

The invention relates to a method for the manufacture of a single-piece piston for combustion engines, comprising a piston shaft, a piston base carried by the piston shaft, as well as at least one hollow throat element formed laterally into a circumferential surface of the piston, by forging and subsequent machine working. The invention likewise relates to a manufacturing line for carrying out such a method, a piston blank manufactured as one piece by forging for the manufacture of a piston for combustion engines and a finish-machined piston designed accordingly.

BACKGROUND

Pistons for combustion engines are usually manufactured by casting or forging processes. The casting technique has the advantage that it allows for the manufacture of complex-shaped pistons of low weight. However, a substantial amount of machining effort must be taken into account for this. This applies in particular if a steel material is to be used in order to manufacture pistons which are suitable for particularly high loading values.

Depending on their size and purpose of application, forged pistons made of steel can be designed as both single-piece and comprising two or more parts. With multi-part pistons assembled from two or more parts, the individual parts are usually connected to one another by suitable joining methods of non-positive and positive fit in such a way that in practical use they resist the forces taking effect on them. Suitable for this purpose are, for example, the welding or conventional screwing or bolting of the individual parts of the piston.

One example of a multi-part piston for a combustion engine is known from DE 102 44 513 A1. This piston comprises a piston upper part forged from steel, into which a combustion recess, a ring wall, and a cooling channel designed in the manner of a hollow throat element are formed. On the other hand, the piston also comprises a piston lower part, which forms the piston shaft carrying the piston upper part and in which are formed hubs for accommodating a piston bolt connecting the piston with a connecting rod. To manufacture this piston, the piston upper part and the piston lower part are pre-formed in separate work processes by forging, and are then finished by machining with the removal of material. The finish-machining of the piston upper part in this situation also comprises the machining with removal of material of the wall sections delimiting the cooling channel, by means of which a metallurgical joining with the piston lower part by welding or soldering is established.

A multi-part arrangement of this type does indeed allow for the provision of a complex form for the piston. Apart from the problems regarding load-bearing capacity which arise from the multi-part design, the associated manufacturing effort and expenditure are, however, considerable.

With the manufacture by forging techniques of a single-piece piston, consisting of one unit, for combustion engines, usually a piston blank is produced in the first instance, which is then finished by machining with removal of material. All the indentations to be formed into the circumferential surface of the piston, such as to save weight, to improve forming behaviour, or hollow throat elements serving as cooling channels, are in this situation usually not produced until the material-removing process.

An example of such manufacture of a single-piece piston is provided in DE 100 13 395 A1. According to the method described therein, firstly a piston blank is forged, in that, starting from one face side, a cut-out is formed into a bolt-type forging blank, referred to as a billet, of which the outer wall forms the piston shaft of the piston blank. A cut-out is then punched into the piston shaft wall. To do this, a milling cutter or turning tool is applied from a lateral direction from the outside onto the circumferential surface of the piston blank.

Despite the advantages achieved by single-piece forming in relation to a multi-part design, single-piece pistons manufactured in a known manner present the disadvantage that they are, generally, heavier than comparable pistons manufactured by casting techniques. In addition to this, the effort and expenditure involved with material-removing finish-machining are high, since in the area of the top land formed at the circumferential edge of the piston base and of the piston shaft large quantities of material must be removed in order to create the required finished shape. This high manufacturing effort leads to high manufacturing costs.

SUMMARY OF THE INVENTION

In one aspect, an embodiment of the invention provides a method and a manufacturing line which allow for economical manufacture of single-piece pistons making use of forging processes. In another aspect, an embodiment of the invention provides a single-piece forged piston blank capable of economical manufacture and a finish-machined piston, likewise capable of economical manufacture.

With regard to the method for the manufacture of a single-piece piston for combustion engines, comprising a piston shaft, a piston base carried by the piston shaft, as well as at least one hollow throat element formed laterally into a circumferential surface of the piston, by forging and subsequent finish-machining, the method includes the following operational steps:

By means of a punch, making use of a principle of backward extrusion, a cut-out is formed into a forging blank starting from a first side, of which an outer wall formed by a material flow against a direction of effect of the punch forms the piston shaft;

Next, a forging tool forming the at least one hollow throat element takes effect on a circumferential surface of the forging blank which is to be provided with the at least one hollow throat element; and Starting from a second face side of the forging blank, the piston base is formed by means of an upset-forging operation and maintains the effect of the forging tool forming the at least one hollow throat element.

In another aspect of the invention, a manufacturing line for the manufacture of a single-piece piston for combustion engines, comprising a piston shaft, a piston base carried by the piston shaft, and at least one hollow throat element formed laterally into a circumferential surface of the piston, features:

a forging device V2 (i.e., a first forging device) provided for the forming of a cut-out into a first face side of a forging blank, the first forging device having a punch which has a punch part arranged centrally and penetrating into the forging blank during a forging lifting movement, which is surrounded by a ring gap, such that a material of the forging blank, during the forging lifting movement, penetrates into the ring gap against a lifting direction of the punch, in accordance with a principle of backward extrusion; and a further forging device V3 (i.e., a second forging device), comprising a mounting for the forging blank formed in the first forging device, a forging tool forming the at least one hollow throat element, an actuating element for bringing the forging tool forming the at least one hollow throat element against a circumferential surface of the forging blank held by the mounting, as well as a punch for forming the piston base by upset-forging the forging blank, starting from a second face side located opposite the cut-out.

The method and the manufacturing line equipped according to an aspect of the invention allow manufacture of piston blanks close to their final dimensions which in the course of the subsequent finish-machining need only to undergo machining with the removal of material to a small extent. This is achieved in one embodiment by the fact that the piston shaft of the piston blank is produced by backward extrusion. During this forming procedure, the material of the forging blank flows against the direction of lift of the forging punch being used for the forming, into a suitably formed groove, such that an especially good trueness to shape is achieved.

According to another aspect of the invention, at least one hollow throat element is already produced on the piston blank by means of a forming operation. For this purpose, a special forging tool is provided, which, after the production of the piston shaft, takes effect on the piston blank in such a way that at least one hollow throat element is formed at the latest during the subsequent forming process of the piston base. The forming of the at least one hollow throat element, which according to an embodiment of the invention already takes place in the course of the forging, allows perceptible reduction of the weight of a piston manufactured in comparison with conventionally manufactured forged pistons, since the forging blank present in each case no longer needs to comprise the volume present in the area of the at least one hollow throat element. In addition to this, the expenditure for the manufacture of the at least one hollow throat element is reduced to a minimum, since, in the course of the finish-machining with removal of material, only minimal material quantities still need to be removed in the area of the at least one hollow throat element.

During carrying out of the method according to another embodiment of the invention, the forging tool forming the at least one hollow throat element can be used in such a way that it forms the at least one hollow throat element by active driving of material into the forging blank. For this purpose, the forging tool concerned can form the at least one hollow throat element, by way of a corresponding forming operation directly into the circumferential surface of the forging blank, before the piston base is produced. During the forming of the piston base, the tool producing the at least one hollow throat element then remains in its forming position, such that the shape of the at least one hollow throat element remains retained even during the forming operation carried out for the production of the piston base.

An embodiment of the method according to an aspect of the invention from the point of view of manufacturing technique, which additionally allows for piston blanks to be forged of which the dimensions differ only minimally from the finished final form of the piston which is to be manufactured is characterised in that the forging blank, after the production of the piston shaft and before the forging tool forming the at least one hollow throat element takes effect, has in the area of the piston shaft a greater diameter than in its section still unformed up to then, such that the forging tool forming the at least one hollow throat element can be applied in the area of the transition between the piston shaft and the hitherto unformed section of the forging blank, without it being necessary in this situation to apply substantial forming forces onto the forging blank. During the subsequent upset-forging carried out to manufacture the piston base, the upset material of the forging blank holds snugly to the forging tool, retained in its position adopted before, such that at least one hollow throat element is formed on the finish-forged piston blank which corresponds particularly precisely to the dimensions of the tool.

If large degrees of forming are to be dealt with during the forming of the piston shaft, it has proved to be advantageous if the forming of the cut-out in the piston shaft is carried out in two steps. For this purpose, the cut-out can be pre-formed, for example in a preliminary step, and is then finish-formed, with the forming of the piston shaft by application of backward extrusion. Accordingly, it can be advantageous, with a manufacturing line according to an aspect of the invention, to arrange a forging device V1 (i.e., a third forging device) for pre-forming the cut-out upstream of the forging device for forming the cut-out in the forging blank.

In another aspect, an embodiment of the invention provides a piston blank for the manufacture of a piston for combustion engines, forged and of one piece, provided with a piston shaft, a piston base carried by the piston shaft, as well as at least one hollow throat element formed laterally into a circumferential surface of the piston blank, is characterised in that the at least one hollow throat element deviates by a maximum of 4 mm from the corresponding finished dimension of the piston to be manufactured from the piston blank. With a piston blank formed in such a manner, the effort for the finish-machining with the removal of material is reduced to a minimum. Depending on the manufacturing precision required in each case, it is even possible to do away altogether with subsequent machining with the removal of material in the area of the at least one hollow throat element. Preferably, in this situation the closeness to the final dimensions of the piston blank produced according to an embodiment of the invention is not restricted to the area of the at least one hollow throat element. Rather, it is favourable if also its diameter in the area of the piston shaft deviates by a machining tolerance of a maximum of 3 mm from the corresponding finished dimension of the piston to be manufactured from the piston blank. In the same manner, it is advantageous if, with the piston blank according to an embodiment of the invention, the piston base deviates by a machining tolerance of a maximum of 4 mm from the corresponding finished dimension of the piston to be manufactured from the piston blank.

According to another aspect of the invention, pistons for combustion engines are manufactured from a piston blank as one piece by forging and comprise a piston shaft, a piston base carried by the piston shaft, as well as at least one hollow throat element formed laterally into a circumferential surface of the piston, are characterised in that a fiber run (i.e., a first fiber run) of the structure on the surface of the at least one hollow throat element corresponds to a fiber run (i.e., a second fiber run) which the forging blank has before the finish-machining at a maximum distance of 3 mm from the surface of the at least one hollow throat element. Because of the great proximity of the dimensions of a piston blank obtained and manufactured in accordance with an embodiment of the invention to the finished dimensions of the piston to be manufactured from it, it is only necessary for a small quantity of material to be removed during finish-machining, in particular in the area of the at least one hollow throat element. Accordingly, the structure of the piston in this area has a fiber run in which, in any event, the fibers lying next to the surface of the piston blank are cut into or interrupted by the machining with removal of material.

BRIEF DESCRIPTION OF THE FIGURES

Various embodiments of the invention are explained in greater detail hereinafter on the basis of drawings. Respectively these show, in diagrammatical form in a longitudinal section:

FIGS. 2a-2d: A forging device for the forming of the piston shaft in four operational settings;

FIGS. 4a-4b: A forging device for the forming of the hollow throat element and of the piston base.

DESCRIPTION

Figures 1A, 1B:
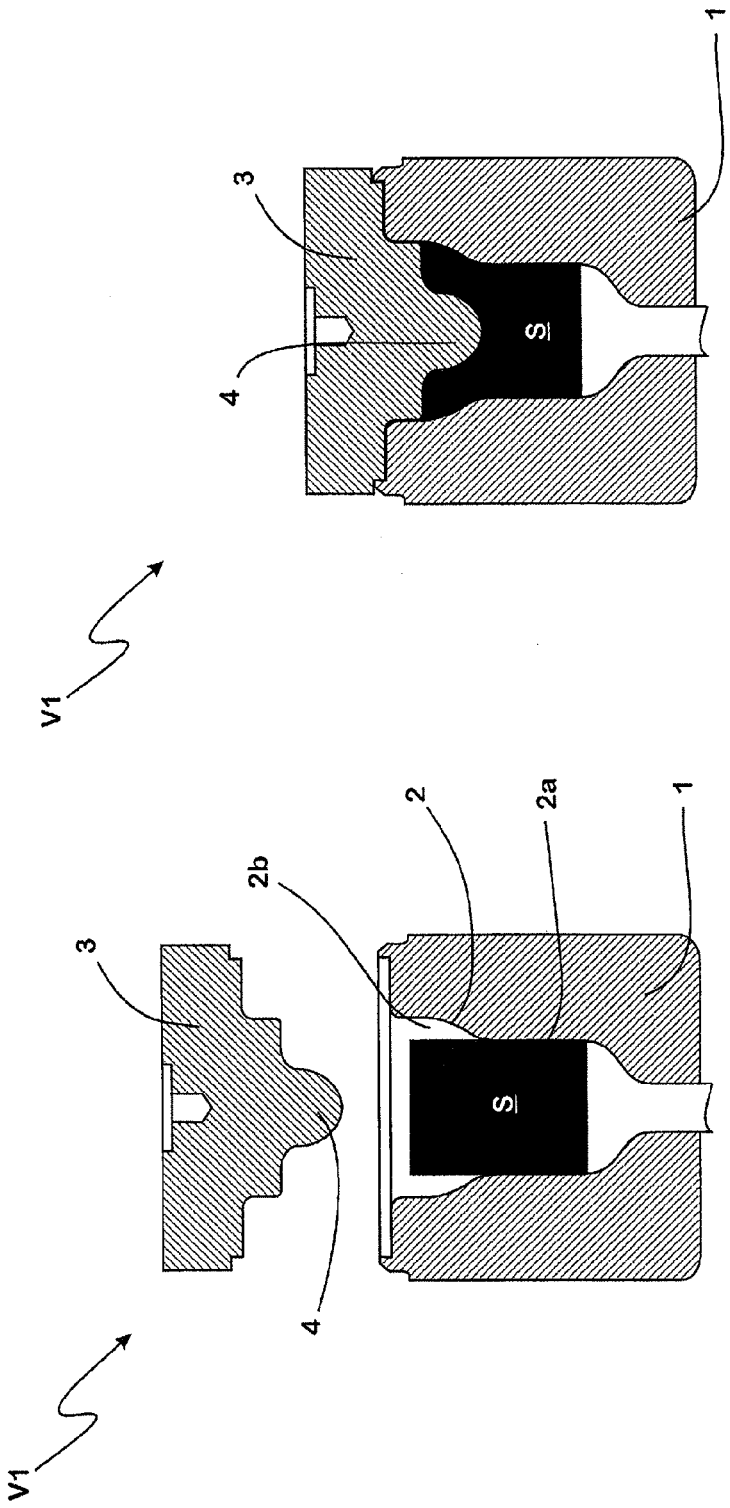
FIGS. 1a,1b: A forging device for the pre-forming of a forging blank in two operational settings.

The forging device V1 represented in FIGS. 1a, 1b for the pre-forming of a cut-out A into a cylindrical forging blank S, consisting of a forged steel, has a die 1, into which is formed a mounting 2, open to the top, for the forging blank S. In its lower area the mounting 2 has a section 2a, in which the diameter of the mounting 2 corresponds to the diameter of the forging blank S. Connected to the top of the section 2a is an extended shell-shaped section 2b, such that the opening diameter of the mounting 2 is larger than the diameter of the forging blank S.

In addition, the forging device V1 comprises a punch 3, which is moved for a forging lifting movement out of a position of rest arranged above the die 1 in the direction of the die 1. The punch 3 carries on its side facing the die 1 a convex pre-cambered embossing mandrel 4, which is arranged concentrically to the mounting 2 of the die 1.

Located in the base of the die 1 is the head of an ejector, with which the forging blank S is ejected after the pre-forming of the cut-out A from the mounting 2 of the die 1.

For the pre-forming of the cut-out A, the cylindrical forging blank S, acquired by sectioning off from bar material, not shown, which has been heated to forging temperature, is placed into the mounting 2 of the die 1 (FIG. 1a). Next, the punch 3 carries out a forging lifting movement, during which the embossing mandrel 4 penetrates into the forging blank S from its face side facing the punch 3. The section of the forging blank S arranged in the upper extended section 2b of the die 2 is thereby widened in such a way that its circumferential surface comes in contact with the inner surface of the section 2b, and, by means of the embossing mandrel, a pre-form Av of the cut-out A is formed into the forging blank S (FIG. 1b).

The forging device V2 represented in FIGS. 2a-2d for the finish-forging of the cut-out A likewise comprises a die 5, which has a mounting 6a, formed into a holder 6, for the forging blank S pre-formed in the device V1. The height and diameter of the mounting 6a correspond to the height and diameter of the unformed section of the forging blank S.

In addition, the forging device V2 is equipped with a punch 7, which carries on its side facing the die 5 an embossing mandrel 8, pre-cambered convex at its tip and otherwise cylindrical, arranged concentrically to the opening of the mounting 6a. The outer shape of the tip of the embossing mandrel 8 corresponds to the inner shape of the cut-out A to be produced in the forging blank S.

The embossing mandrel 8 is surrounded by a ring 9, likewise held in the punch 7 and oriented concentrically to the embossing mandrel 8, of which the opening diameter is greater than the outer diameter of the cylindrical section of the embossing mandrel 8. At the same time, the opening diameter of the ring 9 and the outer diameter of the cylindrical section of the embossing mandrel 8 is greater than the diameter of the unformed section of the forging blank S located in the mounting 6a. In this way, a ring gap 10 open towards the die 5 is formed between the ring 9 and the embossing mandrel 8, the diameter of which is likewise greater than the diameter of the unformed section of the forging blank S.

In its section projecting over the ring gap 10 in the direction of the die 6, a shoulder 11 is formed into the ring 9, such that the opening diameter of the ring 9 in this area opposite its opening diameter is once again extended in the area of the ring gap 10. The opening diameter of the ring 9 extended in the area of the shoulder 11 is adapted to the outer diameter of the cylindrically shaped holder 6, such that the ring 9 laterally surrounds the holder 6 with its extended diameter section when the punch 7 has reached the end position of the forging lifting movement.

The height of the ring gap 10 is greater than the forging lifting movement which the punch 7 carries out. At the same time the forging lifting movement and the position of the shoulder 11 of the ring 9 are dimensioned in such a way that, when the punch 7 is in the end position of the forging lifting movement, there is a gap between it and the shoulder surface of the ring 9 located opposite the face side of the holder 6. In this way, in the area of the shoulder 11, with the punch 7 located in the end position of the forging lifting movement, a ring-shaped space 12 is formed, circumferential to the ring gap 10 and open towards the forging blank S located in the mounting 6a of the holder 6.

During the forming of the forging blank S, the space 12 serves to accommodate superfluous material which is present in the pre-formed area of the forging blank S, in order to promote reliable filling of the ring gap 10 but which cannot be contained by the volume of the ring gap 10. With such piston embodiments, in which the ring gap 10 is reliably filled with material during the forging of the forging blank S without the presence of superfluous material, it is possible to do without the formation of the space 12 and accordingly without the forming of the collar K on the forging blank S.

For finish-forming of the cut-out A, the forging blank S pre-formed in the device V1 is placed with its unformed part into the mounting 6a of the holder 6, such that the section of the forging blank S which is extended during the pre-forming stands freely above the holder 6 (FIG. 2a). The punch 7 then carries out a forging lifting movement, during which the tip of the embossing mandrel 8 travels into the pre-form Av of the cut-out A and in the first instance forces the material of the pre-formed section of the forging blank S laterally until it comes in contact with the inner surface of the ring 9 (FIG. 2b).

Because the material of the forging blank S now cannot divert laterally any more, in accordance with the principle of backward extrusion it accordingly flows against the direction of lift X of the punch 7 into the ring gap 10 until it is filled (i.e., entirely filled). At the same time, the material of the forging blank S fills the space 12 (FIG. 2c). In this way, during finish-forming of the cut-out A, a cylindrical piston shaft KS is formed on the forging blank S next to the cut-out A itself, formed by the material penetrating into the ring gap 10, and surrounding the cut-out A as an outer wall. At the same time, after finish-forming of the cut-out A, the forging blank S has a circumferential collar K, formed in the space 12 in the area of the transition from the piston shaft KS to the part of the forging blank S, up to then unformed, this collar projecting laterally over the piston shaft KS. In order to eject the forging blank from the mounting 6a of the holder 6, an ejector is in turn provided, the head of which is located in the base of the mounting 6a (FIG. 2d).

The forging devices V1 and V2 can be a common part of a forging press, not represented any further here.

Figure 3:
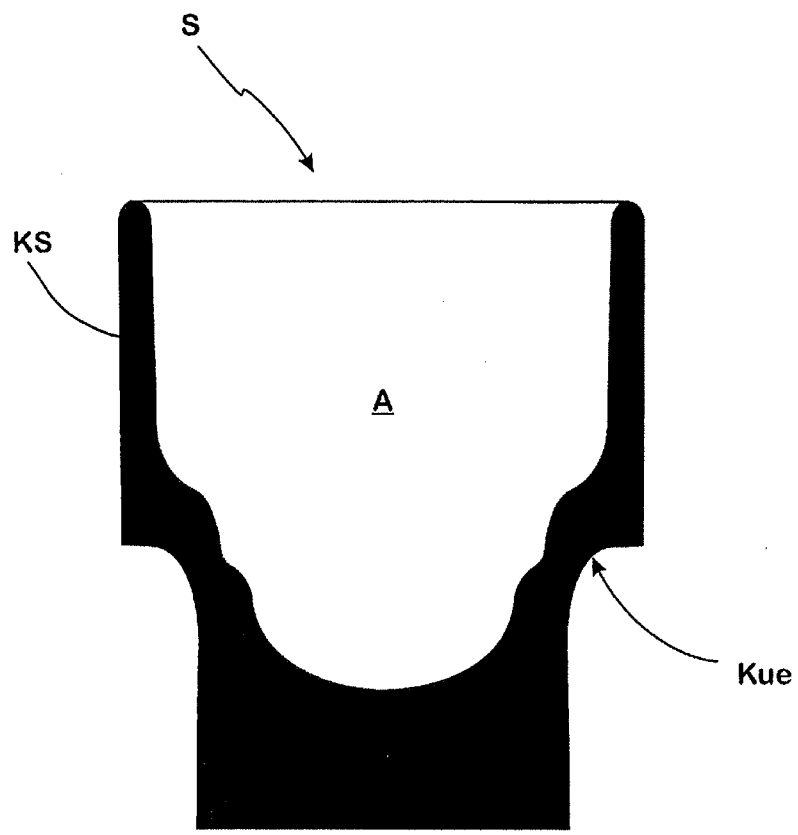
FIG. 3: A forging blank in an intermediate step of manufacture.

After the forming of the cut-out A, the collar K is separated from the forging blank S in a deburring device, not represented here. The forging blank S obtained after this, freed from the collar K, is represented in FIG. 3. The device for separating the collar K from the forging blank S can be a part of a second forging press, which additionally comprises a forging device V3, provided for finish-forging of the piston blank R to be re-formed from the forging blank S.

The forging device V3 has a retaining mandrel 14 mounted on a base plate 13, of which the external shape is adapted to the shape of the cut-out A formed into the forging blank S. At the same time, the height of the retaining mandrel 14 is greater than the height of the piston shaft KS.

The forging device V3 further has two forging tools 15, 16 for forming at least one hollow throat element H at the piston blank R which is to be manufactured. These forging tools 15, 16 are in each case designed as half-shells in shape and can in each case be moved by means of an actuator 17, 18 from a lateral direction against the retaining mandrel 14, such that in their working position they surround the circumference of the retaining mandrel 14 and tension the forging blank S on the retaining mandrel 14. The forging tools 15, 16 carry on their inner surface facing the retaining mandrel 14 a horizontally oriented projection 19 extending radially over the entire width and entire circumference respectively of the individual inner surface in each case. The depth over which the projection 19 projects in each case opposite the inner surface of the forging tools 15, 16 corresponds in this situation to the depth of the throat element Kue, which, during the pre-forming of the cut-out A, is formed in the outside area of the forging blank S at the transition from its unformed section to the formed section. At the same time, both the shape of the free end of the projection 19, as well as its height above the base plate 13, are dimensioned in such a way that with the forging blank S placed with the cut-out A on the retaining mandrel 14 and the forging tools 15, 16 located in the operational position, their projections 19 are in contact flush on the throat element Kue. The cross-section shape of the projection 19 in this situation corresponds to the cross-section shape of the at least one hollow throat element H to be formed into the piston blank R. By means of a shoulder 20 projecting in each case at the foot of the forging tools 15, 16 in the direction of the retaining mandrel 14, the inner surfaces and the projections 19 of the forging tools 15, 16 are held in the operational position at a distance interval from the retaining mandrel 14, this distance corresponding to the reference outer diameter of the piston shaft KS and of the piston base B in each case. At the same time, the height of the shoulder 20 above the base plate 13 is dimensioned in such a way that the height between the shoulder 20 and the projection 19 corresponds to the reference height of the piston shaft KS.

Finally, for upset-forging the forging blank S, the device V3 comprises a punch 22 which is carried by a yoke 23 and is arranged concentrically to the retaining mandrel 14. On its face side facing the retaining mandrel 14, the punch 22 carries elevations by means of which the shape of the combustion chamber recesses M to be formed in the piston base B is determined.

For finish-forging of the piston blank R, the forging blank S is placed with its cut-out A on the retaining mandrel 14, with the forging tools 15, 16 positioned at a distance from the retaining mandrel 14 and with the punch 22 in the rest position, such that the unformed part of the forging blank S points freely in the direction of the punch 22. The forging tools 15, 16 are then moved into their working position, in which they are pressed against the forging blank S located on the retaining mandrel 14, such that the finish-formed piston shaft KS is held in defined position and the projections 19 are located flush in the throat element Kue at the transition to the unformed part of the forging blank S (FIG. 4a).

The yoke 23 with the punch 22 thereupon carries out a forging lifting movement, by means of which the part of the forging blank S, unformed until then, is upset with formation of the piston base B of the piston blank R in the direction of the retaining mandrel 14. In this situation, the material of the previously unformed part of the forging blank S which has now been upset is in contact at the projections 19, such that, in the area of the transition from the piston shaft KS to the piston base B, the at least one hollow throat element H is formed with precise dimensions (FIG. 4b).

Figure 5:
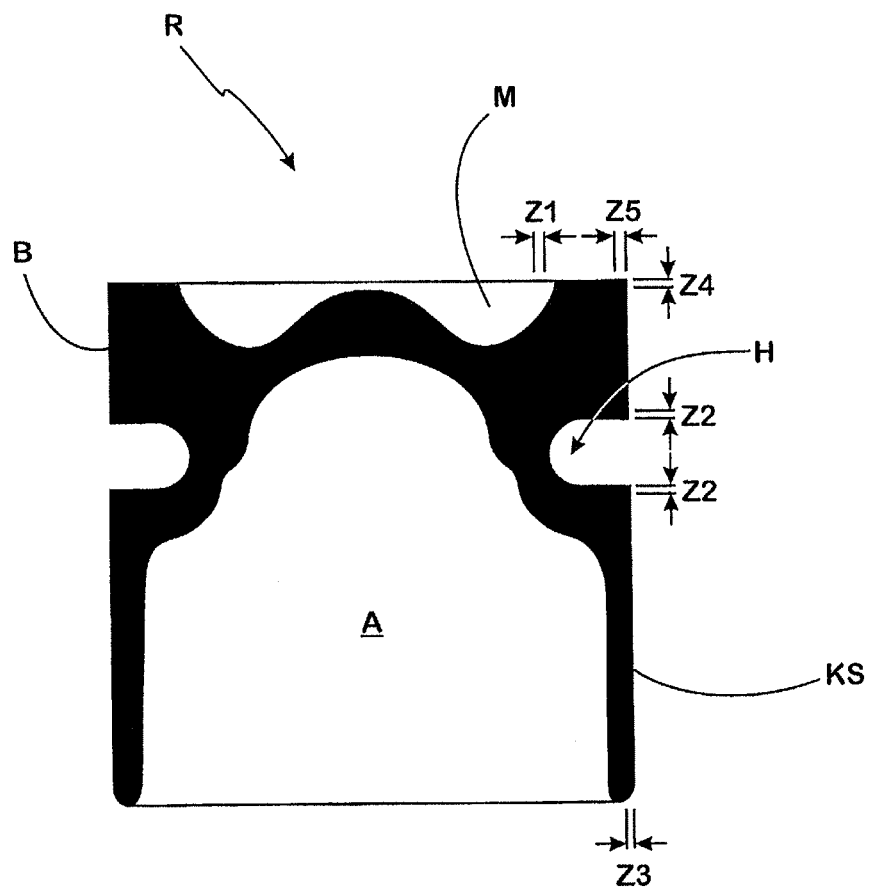
FIG. 5: A finish-forged piston blank.

After the end of the forging lifting movement, the punch 22 and the forging tools 15, 16 are moved back into their rest positions, such that the finish-forged piston blank R (FIG. 5) can be removed from the device V3.

The dimensions of the finish-forged piston blank R deviate in the area of the throat base of the at least one hollow throat element H by a machining tolerance Z1 of 3 mm, in the area of the transition from the at least one hollow throat element H to the adjacent circumferential surfaces of the piston base B and the piston shaft KS respectively by a machining tolerance Z2 of 2 mm, in the area of the circumferential surfaces of the piston shaft KS by a machining tolerance Z3 of likewise 2 mm, in the area of the face surface of the piston base B by a machining tolerance Z3 of likewise 2 mm and in the area of the circumferential surface of the piston base B by a machining tolerance Z3 of, again, 3 mm, from the final dimensions of the piston, not represented here, to be finish-manufactured from the piston blank R. The final finish-machining of the piston blank R, with removal of material, is carried out in an inherently known manner with conventional machining devices.

The devices V1, V2 and V3, as well as the devices required for the finish-machining with removal of material, are part of a manufacturing line, not further represented, on which the pistons finish-machined from the forging blanks S are manufactured. For this purpose, the manufacturing line may comprise, in addition to the forging devices V1, V2 and V3 presented here and the devices already mentioned for finish-machining with removal of material, in each case such devices as are necessary for heat treatment and cleaning.

Inasmuch as, according to an aspect of the invention, forging of the forging blank S is carried out on forming the cut-out A in the forging device V1 in such a way that the throat element Kue is formed in the area of the transition between the area which is unformed until the end of machining in the device V1 and the piston shaft KS of the forging blank S, it is then possible subsequently for the at least one hollow throat element H to be formed simultaneously with forming of the piston base B. In addition to the advantages of a high approximation to the final dimensions and trueness to shape, in this way it is possible to save on at least one operational procedure in comparison with the conventional manner of manufacture which was previously required in order to form the at least one hollow throat element into the piston blank. As a result, an embodiment of the invention therefore allows for increased productivity by shortening the cycle times with lower temperature losses of the forged parts.

REFERENCE NUMBERS

V1 Forging device
1 Die
2 Mounting
2a Lower section of the mounting 2
2b Shell-shaped extended section of the mounting 2
3 Punch
4 Embossing mandrel
V2 Forging device
5 Die
6 Holder
6a Mounting for holder 6
7 Punch
8 Embossing mandrel
9 Ring
10 Ring gap
11 Shoulder element
12 Space
X Lifting device for the punch 7
V3 Forging device
13 Base plate
14 Retaining mandrel
15, 16 Forging tools
17, 18 Actuators
19 Projection
20 Shoulder
22 Punch
23 Yoke
A Cut-out
Av Pre-form of the cut-out A
H Hollow throat element
K Collar
Kue Throat at the transition between the unformed and formed parts of the forging blank S after the manufacture of the cut-out A
KS Piston shaft
M Combustion chamber recess
R Piston blank
S Forging blank

The invention claimed is:

1. A method of manufacturing a single-piece piston for a combustion engine, the method comprising:
    forging a first recess into a first face of a blank using a punch, whereby a wall is formed from a flow of a material of the blank against a punching direction of the punch; and
    forging a second recess into a second face, which opposes the first face, of the blank,
    wherein a lateral channel is formed into an outer circumferential surface of the blank from a flow of the material of the blank against a projection of a forging tool, and wherein the lateral channel is formed, at the latest, during the forging of the second recess into the second face of the blank.

2. The method of claim 1, wherein forging the first recess into the first face of the blank includes pre-forging the first recess and finish-forming the first recess.

3. The method of claim 2, wherein an upper portion of the blank is widened from a flow of the material of the blank during the pre-forming of the first recess.

4. The method of claim 2, wherein the wall is formed circumferentially around the first recess from the flow of the material of the blank during the finish-forging of the first recess.

5. The method of claim 1, wherein after forging the first recess into the first face and before forging the second recess into the second face, wherein an area enclosed by the wall is greater than an area of the blank before the first recess is forged.

6. The method of claim 1, wherein after forging the first recess into the first face and before forging the second recess into the second face, the lateral channel is formed at a transition between the wall and an unformed portion of the blank.

7. The method of claim 1, wherein a projecting ring is formed on outer circumferential surface of the blank from the flow of the material of the blank during the forging of the first recess.

8. The method of claim 7, further comprising separating the projecting ring from the blank.

* * * * *

UNITED STATES PATENT AND TRADEMARK OFFICE
CERTIFICATE OF CORRECTION

PATENT NO. : 8,572,843 B2  
APPLICATION NO. : 12/064891  
DATED : November 5, 2013  
INVENTOR(S) : Carlos Furquim Heraldo et al.

It is certified that error appears in the above-identified patent and that said Letters Patent is hereby corrected as shown below:

Title Page, Column 1, Item (73) Assignee, Line 1, delete "Metalurgica" and insert -- Metalúrgica --

Title Page, Column 1, Item (73) Assignee, Line 2, delete "Campo Paulistra" and insert -- Campo Paulista --

Title Page, Column 1, Item (73) Assignee, Line 2, delete "(ES)" and insert -- (BR) --

Signed and Sealed this  
Fifteenth Day of April, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,572,843 B2  Page 1 of 1
APPLICATION NO. : 12/064891
DATED : November 5, 2013
INVENTOR(S) : Heraldo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1192 days.

Signed and Sealed this
Twenty-second Day of September, 2015

Michelle K. Lee
*Director of the United States Patent and Trademark Office*